(12) United States Patent
Daniels (10) Patent No.: US 11,807,334 B1
(45) Date of Patent: Nov. 7, 2023

(54) THROTTLE ASSEMBLY

(71) Applicant: T-REX MOTO-X L.L.C., Driggs, ID (US)

(72) Inventor: Danny Duke Daniels, Driggs, ID (US)

(73) Assignee: T-REX MOTO-X L.L.C., Driggs, ID (US)

( * ) Notice: Subject to any disclaimer, the term of this patent is extended or adjusted under 35 U.S.C. 154(b) by 0 days.

(21) Appl. No.: 18/048,910

(22) Filed: Oct. 24, 2022

(51) Int. Cl.
*B62K 23/02* (2006.01)
*B62K 23/04* (2006.01)

(52) U.S. Cl.
CPC .................................. *B62K 23/04* (2013.01)

(58) Field of Classification Search
CPC ........... B62K 23/02; B62K 23/04; G05G 1/08
See application file for complete search history.

(56) References Cited

U.S. PATENT DOCUMENTS

| | | | | |
|---|---|---|---|---|
| 4,352,303 | A * | 10/1982 | Christner | B62K 23/04 74/489 |
| 6,276,227 | B1 * | 8/2001 | Ose | B62M 25/04 474/166 |
| 6,571,726 | B2 * | 6/2003 | Tsai | B62K 23/04 116/284 |
| 7,735,392 | B2 * | 6/2010 | Poulos, Jr. | B62K 23/04 74/502.2 |
| 8,082,819 | B2 * | 12/2011 | Case | B62K 23/06 74/489 |
| 11,052,963 | B2 * | 7/2021 | Erdmann | F16C 19/06 |

FOREIGN PATENT DOCUMENTS

DE 3601921 A1 * 7/1987

OTHER PUBLICATIONS

T-Rex Moto-x LLC; https://www.youtube.com/watch?v=C9nWPen0e2l; Published on Oct. 26, 2021 (Year: 2021).*
T-Rex Moto Throttle & Cable Installation; https://www.youtube.com/watch?v=YD2Bnh30tT8; Published on Sep. 20, 2021 (Year: 2021).*

* cited by examiner

*Primary Examiner* — Adam D Rogers
(74) *Attorney, Agent, or Firm* — PARSONS BEHLE & LATIMER (57) ABSTRACT

A throttle assembly that includes a housing with an internal cavity. The housing includes an upper port and a first lower port that provides access to the internal cavity. A plate with a second lower port encloses the internal cavity. The second lower port is aligned with the first lower port. A hollow tube having an open first end and a closed second end includes a cable attachment profile on the first end. The first end of the hollow tube is positioned within the internal cavity of the housing. The hollow tube extends out the second lower port of the plate away from the housing and may twist axially within the housing. A clamp positioned around the first lower port is connected to the housing. An insert with internal threads is positioned within the upper port. A transparent plate provides visual access to the internal cavity of the housing.

20 Claims, 9 Drawing Sheets

THROTTLE ASSEMBLY

FIELD OF THE DISCLOSURE

The embodiments described herein relate to a throttle assembly for motorcycles, all-terrain vehicles (ATVs), personal watercraft (PWC), snowmobiles, and any other vehicle with a hand-actuated throttle.

BACKGROUND

Description of the Related Art

The herein disclosed examples and embodiments are described with reference to motorcycles but are equally applicable to ATVs, PWCs, snowmobiles, or any other vehicle with a hand-actuated throttle. Motorcycles throttle assemblies often include a plastic tube or a two piece metal tube connected to a throttle cable to control the throttle of the motorcycle. The plastic tube may become brittle and break requiring replacement of the entire throttle assembly or at least the plastic tube. Two piece metal tubes may come apart due to the rugged nature of riding a motorcycle also requiring replacement. If a throttle assembly does is not operating properly, a user may have to disassemble the throttle assembly to determine whether the problem is within the throttle assembly or elsewhere. For example, the throttle cable may have been disconnected from the tube, or dirt and/or debris may be preventing the proper rotation of the tube to change the throttle (e.g., revolutions per minute of the engine). Typical throttle assemblies are designed to receive a single size of cable housing connected to the throttle cable. A user may have to typically purchase a new throttle assembly if it is desired to change the size of the throttle cable on the user's motorcycle. Other disadvantages may exist.

SUMMARY

The present disclosure is directed to a throttle assembly that overcomes at least some of the disadvantages discussed above.

One embodiment of the disclosure is an apparatus. The apparatus comprises a housing having front side, a back side opposite the front side, a top, a bottom opposite the top, a left side, a right side opposite the left side, and an internal cavity. The housing includes an upper port on the left side that provides access to the internal cavity and a first lower port on the left side that provides access to the internal cavity. The apparatus includes a plate connected to the right side of the housing. The plate encloses the internal cavity. The plate includes a second lower port that provides access to the internal cavity, the second lower port being axially aligned with the first lower port on the left side of the housing.

The apparatus includes a hollow tube having a first end and a second end. The hollow tube is open at the first end and closed at the second end. The hollow tube includes a cable attachment profile on an exterior of the first end. The first end of the hollow tube is positioned within the internal cavity of the housing. The hollow tube extends out the second lower port of the plate away from the housing with the second end of the tube being positioned away from the right side of the housing. The hollow tube is configured to receive a portion of a handlebar via the first lower port in the housing and via the first end of the hollow tube. The hollow tube may twist axially within the housing. The apparatus includes a clamp connected to the housing. The clamp is positioned on the left side of the housing and is positioned around the first lower port. The apparatus includes a first insert positioned within the upper port. The first insert includes first internal threads.

The apparatus may include at least one fastener that selectively retains the insert within the upper port. The at least one fastener may be selectively removed to remove the first insert and a second insert having second internal threads may be inserted into the upper port. The second internal threads may differ from the first internal threads. The hollow tube may be comprised of aluminum. The hollow tube may be a single piece of aluminum. The apparatus may include a transparent plate on a portion of the top of the housing. The transparent plate enables visual access to the internal cavity of the housing. The apparatus may include a fastener that connects the transparent plate to the housing. The apparatus may include a pulley positioned between the transparent plate and the housing. The fastener the connects the transparent plate to the housing may rotatably connect the pulley to the transparent plate and the housing.

One embodiment of the present disclosure is a system. The system includes a housing having an internal cavity. The housing includes an upper port that provides access to the internal cavity and a first lower port that provides access to the internal cavity. The system includes a plate connected to the housing. The plate encloses the internal cavity of the housing. The plate includes a second lower port that provides access to the internal cavity. The second lower port is axially aligned with the first lower port in the housing.

The system includes a hollow tube having a first end and a second end. The hollow tube is open at the first end and closed at the second end with the first end of the tube being positioned within the internal cavity of the housing. The hollow tube extends out the second lower port of the plate away from the housing with the second end of the tube being positioned away from the right side of the housing. The hollow tube is configured to receive a portion of a handlebar via the first lower port in the housing and via the first end of the hollow tube. The system includes a first insert positioned within the upper port. The first insert includes first internal threads. The system includes a first cable. The first cable enters the housing via the first insert in the upper port with an end of the first cable being connected to the first end of the hollow tube. The system includes a first cable housing being threaded into the first insert via the first internal threads.

The system may include a clamp connected to the housing with the clamp being positioned around the first lower port. The system may include a portion of a handlebar of a motorcycle inserted into the hollow tube via the first lower port and the first end of the hollow tube. The clamp may selectively secure the housing to the handlebar. The axial rotation of the hollow tube within the housing may adjust a throttle of the motorcycle.

The system may include a second cable and a second insert. The second insert may be inserted into the upper port upon removal of the first cable and the first insert, wherein the second insert includes second internal threads that differ from the first internal threads. The system may include a second cable housing threaded into the second insert via the second internal threads.

The system may include a transparent plate connected to a portion of the housing. The transparent plate provides visual access to the internal cavity of the housing. The system may include a pulley positioned between the transparent plate and the housing. A portion of the first cable may be positioned within a portion of the pulley between the first insert and the first end of the hollow tube. The hollow tube may rotate within in the housing to move the first end of the cable.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the invention as defined by the appended claims.

DETAILED DESCRIPTION

Figure 1:
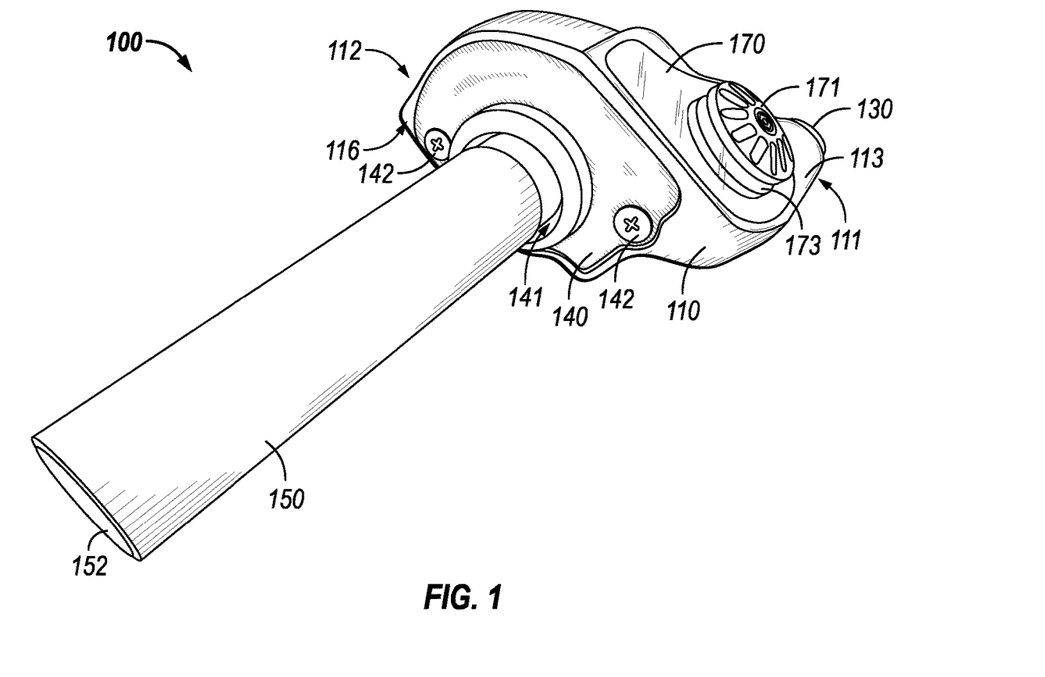
FIG. 1 shows a perspective view of an embodiment of a throttle assembly.
Figure 2:
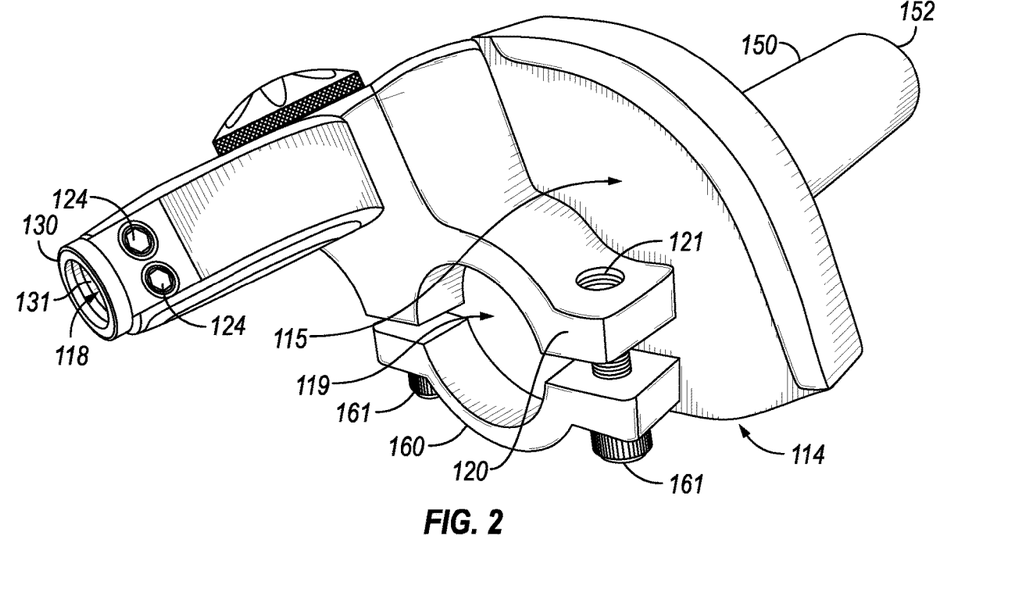
FIG. 2 shows a perspective view of an embodiment of a throttle assembly.

FIGS. 1 and 2 show an apparatus, also referred to herein as a motorcycle throttle or throttle assembly, 100. The apparatus includes a housing 110 having front side 111, a back side 112 opposite the front side 111, a top 113, a bottom 114 opposite the top 113, a left side 115, a right side 116 opposite the left side 115, and an internal cavity 117 (best shown in FIGS. 3A, 4 and 5). The housing 110 includes an upper port 118 on the left side 115 that provides access to the internal cavity 117 and a first lower port 119 on the left side 115 that provides access to the internal cavity 117. The apparatus 100 includes a plate 140 connected to the right side 116 of the housing 110. The plate 140 is connected to the housing 110 by one or more fasteners 142. The plate 140 encloses the internal cavity 117. The plate 140 includes a second lower port 141 (best shown in FIG. 10) that provides access to the internal cavity 117. The second lower port 141 is axially aligned with the first lower port 119 on the left side 115 of the housing 110.

The apparatus, or throttle assembly, 100 includes a hollow tube 150 having a first end 151 (shown in FIG. 6) and a second end 152. The hollow tube, also referred to a throttle actuator, 150 is open at the first end 151 and closed at the second end 152. The hollow tube 150 includes a cable attachment profile 153 on an exterior of the first end 151. The cable attachment profile 153 is configured to retain an end of a throttle cable as discussed herein. The first end 151 of the hollow tube 150 is positioned within the internal cavity 117 of the housing 110. The hollow tube 150 extends out the second lower port 141 of the plate 140 away from the housing 110 with the second end 152 of the hollow tube 150 being positioned away from the right side 116 of the housing 110.

The hollow tube 150 is configured to receive a portion of a handlebar 300 (shown in FIG. 15) via the first lower port 119 in the housing 110 and via the first end 151 of the hollow tube 150. The hollow tube 150 may twist axially within the housing 110. The hollow tube, or throttle actuator, 150 is twisted to control the revolutions per minute (RPM) of a motorcycle engine as would be appreciated by one of ordinary skill in the art having the benefit of this disclosure.

The throttle assembly, or apparatus, 100 includes a clamp 120, 160 connected to the housing 110. A first portion 120 of the clamp may be integral with the housing 110 with a second portion 160 being movable with respect to the first portion 120. The clamp portions 120, 160 include threaded holes 121 to receive fasteners 161. The fasteners 161 may be used to secure the first portion 120 to the second portion 160. The clamp 120, 160 may be used to secure the throttle assembly 100 on the handlebars 300 of a motorcycle. The clamp 120, 160 is positioned on the left side 115 of the housing 110 and is positioned around the first lower port 119. The apparatus 100 includes a first insert 130 positioned within the upper port 118. The first insert 130 includes first internal threads 131.

The motorcycle throttle 100 includes at least one fastener 124 that selectively retains the insert 130 within the upper port 118. Two fasteners 124 may be used to selectively retain the insert 130 in the upper port 118 as shown in FIG. 2. The number, size, configuration, location, and/or shape of the fasteners 124 may be varied as would be appreciated by one of ordinary skill in the art having the benefit of this disclosure. The fasteners 124 may be selectively removed to remove the first insert 130 and a second insert 130A, 130B, or 130C (shown in FIG. 11) having second internal threads 131A, 131B, 131C (shown in FIG. 11) may be inserted into the upper port 118. The second internal threads 131A, 131B, 131C may differ from the first internal threads 131. The replacement of an insert 130 enables a differently sized throttle cable to be used with the throttle assembly 100 without replacing the entire throttle assembly 100 as would be appreciated by one of ordinary skill in the art having the benefit of this disclosure.

The hollow tube, or throttle actuator, 150 may be comprised of aluminum and may be formed from a single billet of aluminum. A hollow tube 150 formed from a single billet of aluminum may be less apt to fail and/or break than prior throttle actuators formed of plastic or formed of multiple pieces. The throttle assembly, or apparatus, 100 includes a transparent plate 170 on a portion of the top 113 of the housing 110. The transparent plate 170 encloses a portion of the internal cavity 117. The transparent plate 170 enables visual access to the internal cavity 117 of the housing 110. A fastener 171 connects the transparent plate 170 to the housing 110. The fastener 171 may be an oversized fastener to better enable the removal of the transparent plate 170, if needed. The apparatus 100 includes a pulley 173 positioned between the transparent plate 170 and the housing 110. The fastener 171 rotatably connects the pulley 173 to the transparent plate 170 and the housing 110.

Figure 3A:
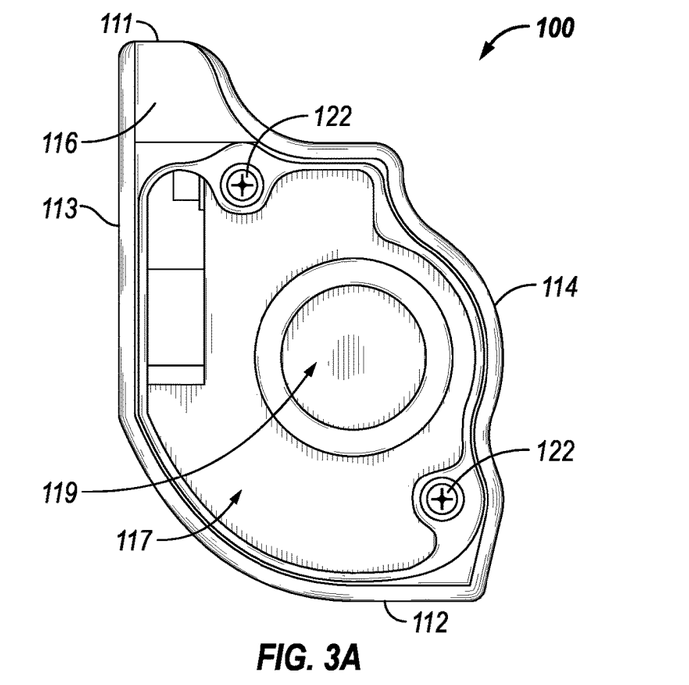
FIG. 3A is a right side view of an embodiment of a housing for a throttle assembly.
Figure 3B:
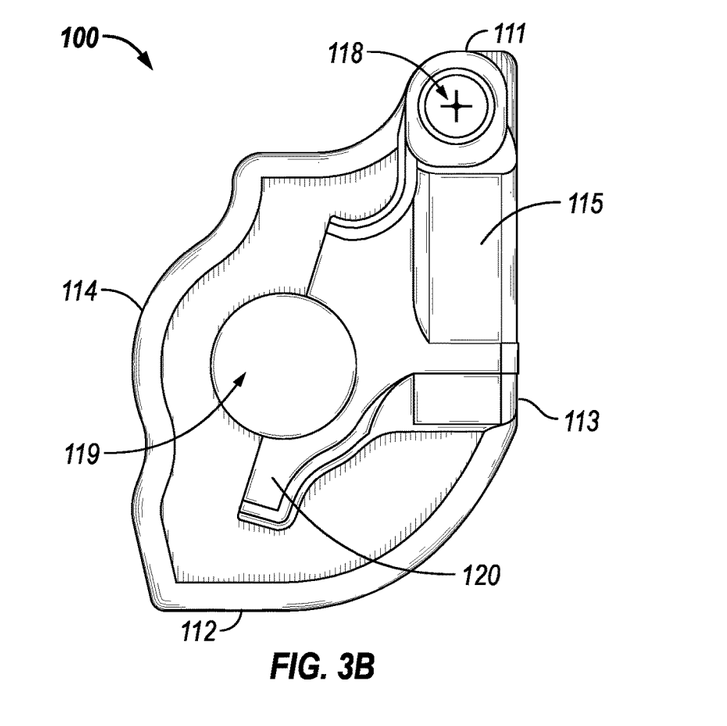
FIG. 3B is a left side view of the housing of FIG. 3.
Figure 4:
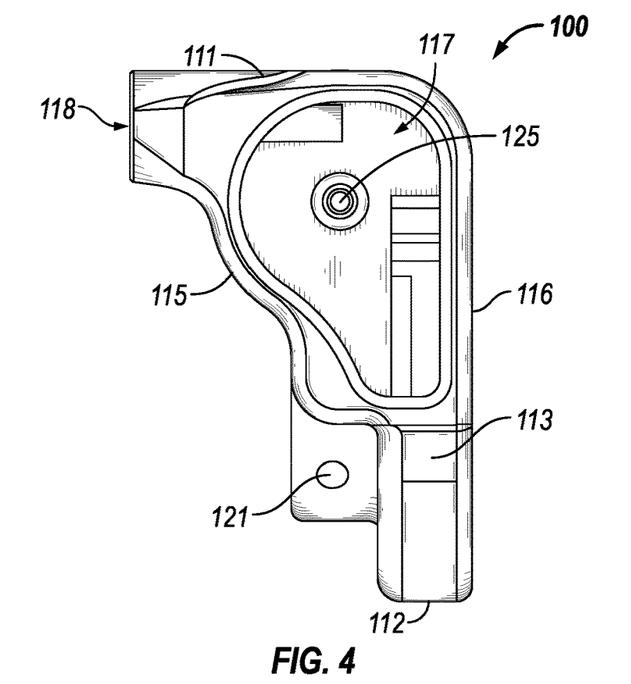
FIG. 4 is a top view of the housing of FIG. 3.
Figure 5:
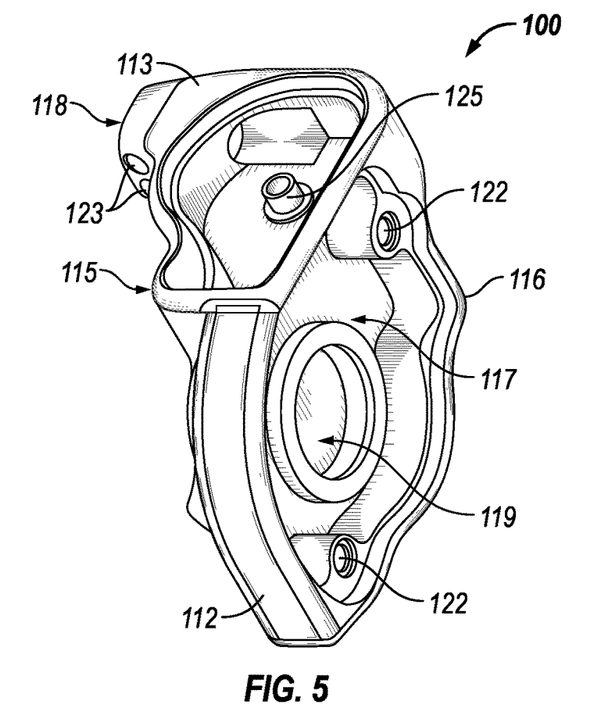
FIG. 5 is a perspective view of the housing of FIG. 3.

FIG. 3A shows a right side view of the housing 110 with the plate 140 removed for clarity. FIG. 3B shows the left side view of the housing 110 with the second portion 160 of the clamp removed for clarity. FIG. 4 shows a top view of the housing 110 with the transparent plate 170, fastener 171, and pulley 173 removed for clarity. FIG. 5 shows a perspective view of the housing 110 with the plate 140, the transparent plate 170, fastener 171, and pulley 173 removed for clarity. Referring to FIGS. 3A, 3B, 4, and 5, the housing 110 includes a front side 111, a back side 112, a top 113, a bottom 114, a left side 115, a right side 116, and an internal cavity 117. The housing 110 includes threaded holes 122 to receive fasteners 142 to secure the plate 140 to the housing 110. The housing 110 includes a first lower port 119. The first lower port 119 is aligned with the second lower port 141 of the plate 140 when the plate is connected to the housing 110. The first end 151 of the throttle actuator, also referred to herein as the hollow tube, 150 will be positioned within the cavity 117 of the housing 110 with the hollow tube 150 extending through the second lower port 141 of the plate 140. The throttle assembly 100 may be installed onto the handlebars 300 of a motorcycle by inserting the end of the handlebar 300 into the hollow portion of the throttle actuator 150 via the first lower port 119 of the housing 110.

The left side 115 of the housing 110 includes a first portion 120 of a clamp. The clamp may be used to secure the throttle housing 110 to the handlebars 300 of a motorcycle as discussed herein. The first portion 120 of the clamp is positioned around the first lower port 119 of the housing 110 as shown in FIG. 3B. The housing 110 includes an upper port 118 on the left side 115 of the housing 110. A throttle cable may be inserted into the housing 110 through the upper port 118 as discussed herein.

The housing 110 includes a threaded hole 125 into which the threads 172 on the threaded portion (shown in FIG. 9) of a fastener 171 (shown in FIGS. 1 and 8) may be threaded to secure the pulley 173 within the internal cavity 117 and to secure the transparent plate 170 to the housing 110. Threaded holes 162 in the clamp portions 120, 160 enable fasteners 161 to secure the clamp 120, 160 to the handlebar 300 of a motorcycle. The housing 110 includes one or more threaded holes 123 for the insertion of fasteners 124 to secure an insert 130 (not shown in FIGS. 3A-5) within the upper port 118 of the housing 110. The fasteners 124 may be removed from the threaded holes 123 to remove the insert 130 the housing 110. This provides that different inserts 130 may be used with the housing 110 for use with different throttle cables having differently sized cable housings 210, 210A (shown in FIGS. 12 and 13) as would be appreciated by one of ordinary skill in the art having the benefit of this disclosure.

Figure 6:
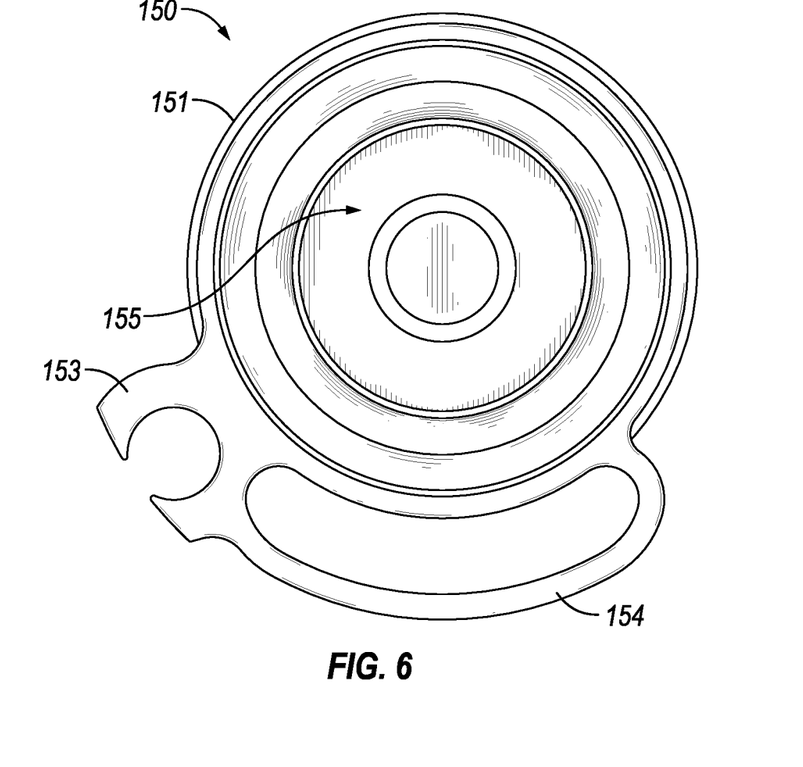
FIG. 6 is an end view of an embodiment of a hollow tube for use with a throttle assembly.

FIG. 6 shows an end view of the hollow tube, or throttle actuator, 150. The first end 151 of the hollow tube 150 includes a cable attachment profile 153. An end of a throttle cable may be attached to the throttle actuator 150 via the cable attachment profile 153 as would be appreciated by one of ordinary skill in the art having the benefit of this disclosure. The throttle actuator 150 includes an interior cavity 155 into which a portion of a motorcycle handlebar 300 may be inserted into as would be appreciated by one of ordinary skill in the art having the benefit of this disclosure. The throttle actuator 150 include a protrusion 154 adjacent to the cable attachment profile 153. The protrusion 154 is configured to limit the rotational movement of the throttle actuator 150 within the housing 110 as desired. The protrusion 154 is configured to limit the position of the throttle actuator 150 between a position in which an attached throttle cable is at a position of lowest RPM for the engine to a position in which the attached throttle cable is a position causing the highest RPM for the engine.

Figure 7:
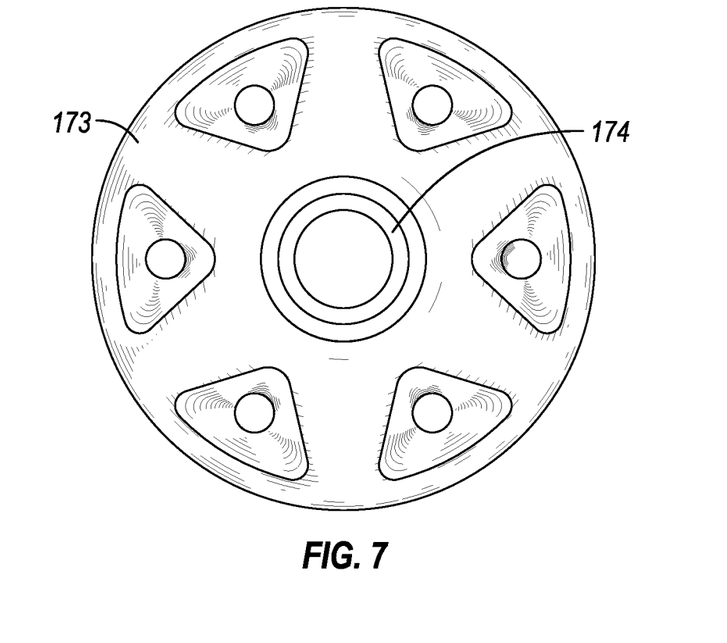
FIG. 7 shows an embodiment of a pulley for use with a throttle assembly.

FIG. 7 shows an embodiment of a pulley 173 that may be positioned within the internal cavity 117 of the housing 110. The pulley 173 includes a central aperture 174 through which a fastener may be positioned to rotatably connect the pulley 173 to the housing 110. A portion of the throttle cable 200 (best shown in FIGS. 12 and 14) may be positioned within the pulley 173 as the throttle cable 200 travels from the upper port 118 of the housing 110 to the first end 151 of the throttle actuator 150, as referred to herein as the hollow tube.

Figure 8:
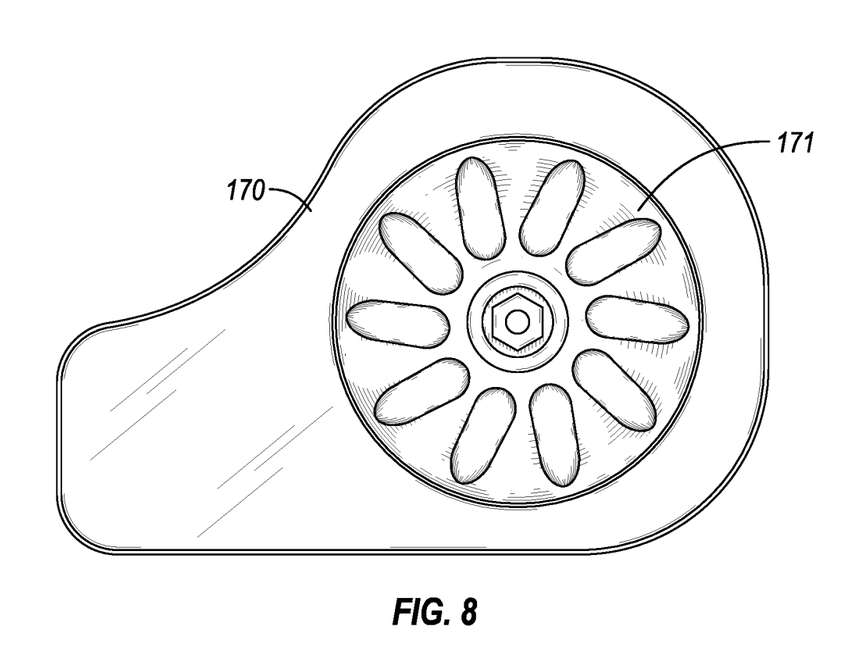
FIG. 8 shows an embodiment of a transparent plate and fastener for use with a throttle assembly.
Figure 9:
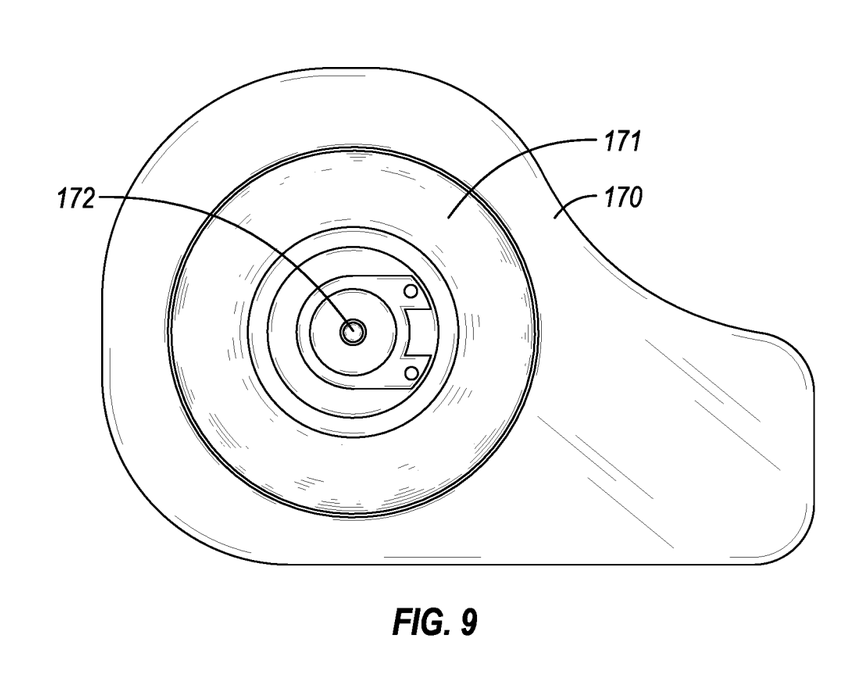
FIG. 9 shows an embodiment of a transparent plate and fastener for use with a throttle assembly.

FIG. 8 shows a top view of the transparent plate 170 and fastener 171 that secures the transparent plate 170 and pulley 173 to the housing. FIG. 9 shows a bottom view of the transparent plate 170 and fastener 171. Threads 172 on the fastener 171 are threaded into threaded hole 125 (best shown in FIGS. 4 and 5) of the housing 110. The transparent plate 170 enables a user to view inside the internal cavity 117 of the housing 110. For example, a user may be able to inspect whether the throttle cable 200 is properly connected to the first end 151 of the hollow tube, or throttle actuator, 150. The transparent plate 170 also enables a user to determine whether dirt and/or debris are within the internal cavity 117 of the housing 110 and preventing the throttle actuator 150 to be properly moving within the housing 110. The shape, location, size, and/or thickness of the transparent plate 170 may be varied as would be appreciated by one of ordinary skill in the art having the benefit of this disclosure.

Figure 10:
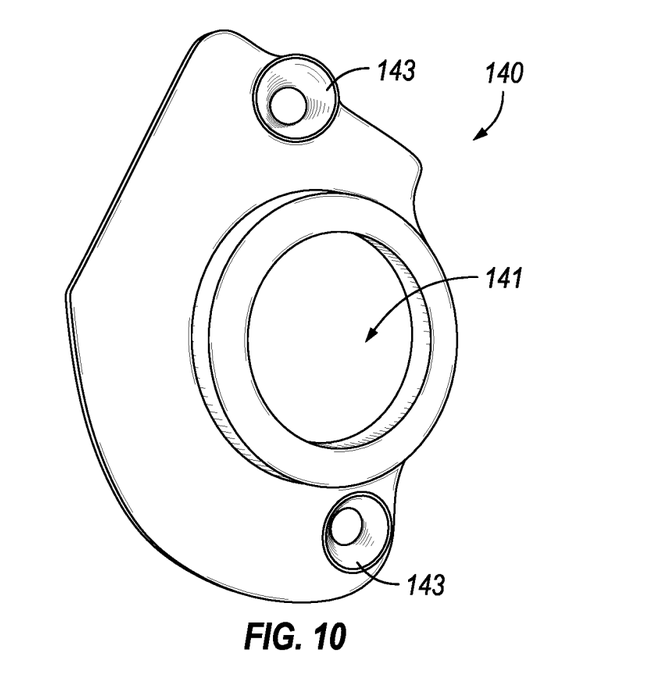
FIG. 10 shows an embodiment of a plate to enclose the internal cavity of a housing for use with a throttle assembly.

FIG. 10 shows an embodiment of a plate 140 that may be connected to the right side 116 of the housing 110. The plate 140 encloses a portion of the internal cavity 117 of the housing 110. The plate 140 includes a second lower port 141. Fasteners 142 may be inserted through apertures 143 in the plate 140 to secure the plate 140 to the housing 110. The size, shape, number, and/or location of the apertures 143 may be varied as would be appreciated by one of ordinary skill in the art having the benefit of this disclosure. The second lower port 141 of the plate 140 is axially aligned with the first lower port 119 of the housing 110 when the plate 140 is secured to the right side 116 of the housing 110. A portion of the throttle actuator 150 extends out of the second lower port 141 of the plate 140.

Figure 11:
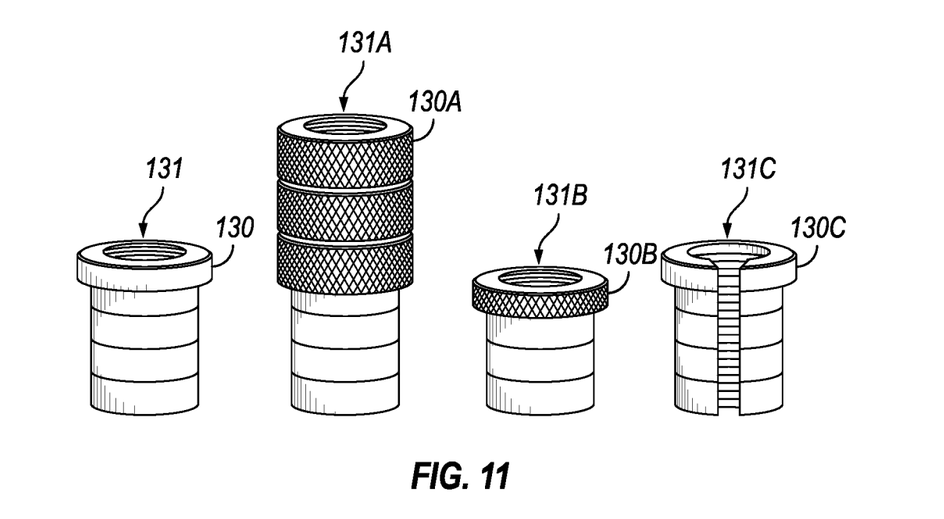
FIG. 11 shows various embodiments of inserts for use with a throttle assembly.

FIG. 11 shows a plurality of inserts 130, 130A, 130B, 130C that may be inserted into the upper port 118 of the housing 110. Each of the inserts 130, 130A, 130B, 130C includes internal threads 131, 131A, 131B, 131C to enable a cable housing 210, 210A to be connected to a respective insert 130, 130A, 130B, 130C. The inserts 130, 130A, 130B, 130C are secured to the housing 110 via one or more fasteners 124 as discussed herein. The removable inserts 130, 130A, 130B, 130C enable the throttle assembly 100 to be used with different sizes and kinds of throttle cables 200, 200A and cable housings 210, 210A without having to replace the entire throttle assembly 100 or housing 110 as would be appreciated by one of ordinary skill in the art having the benefit of this disclosure.

Figure 12:
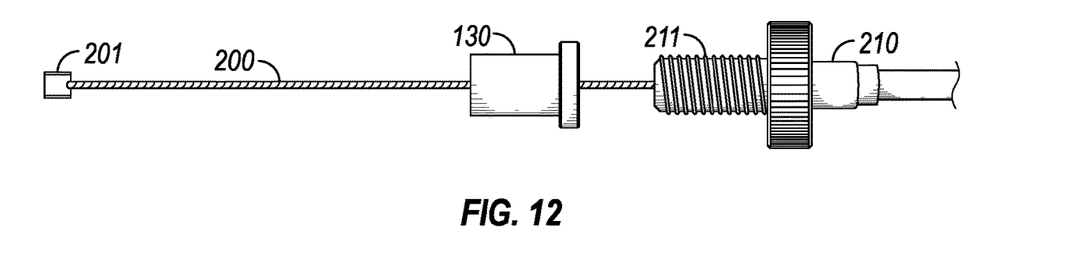
FIG. 12 shows an embodiment of a throttle cable, insert, and cable housing for use with a throttle assembly.

FIG. 12 shows a first throttle cable 200 with a portion of the first throttle cable 200 positioned through a first insert 130. The end 201 of the first throttle cable 200 can be connected to the first end 151 of the hollow tube 150 via the cable attachment profile 153 as would be appreciated by one of ordinary skill in the art having the benefit of this disclosure. A first cable housing 210 is connected to the first throttle cable 200. The first throttle cable 200 may be connected to the first insert 130 via threads 211.

Figure 13:
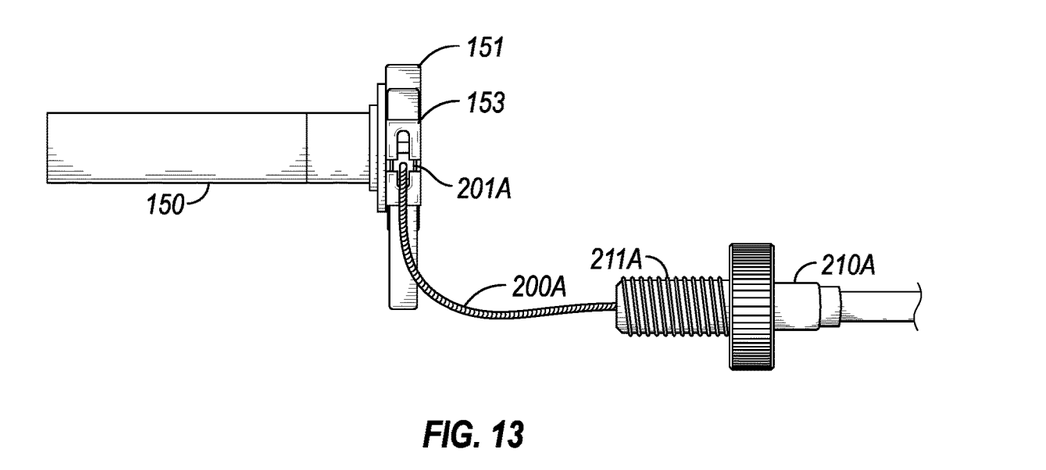
FIG. 13 shows an embodiment of a throttle cable and cable housing with the throttle cable connected to a hollow tube for use with a throttle assembly.

FIG. 13 shows a second throttle cable 200A with the end 201A of the second throttle cable 200A connected to the first end 151 of the hollow tube 150 via the cable attachment profile 153. A second cable housing 210A is connected to the second throttle cable 200A. The second cable housing 200A may be connected to a second insert 130A via threads 211A as would be appreciated by one of ordinary skill in the art having the benefit of this disclosure.

Figure 14:
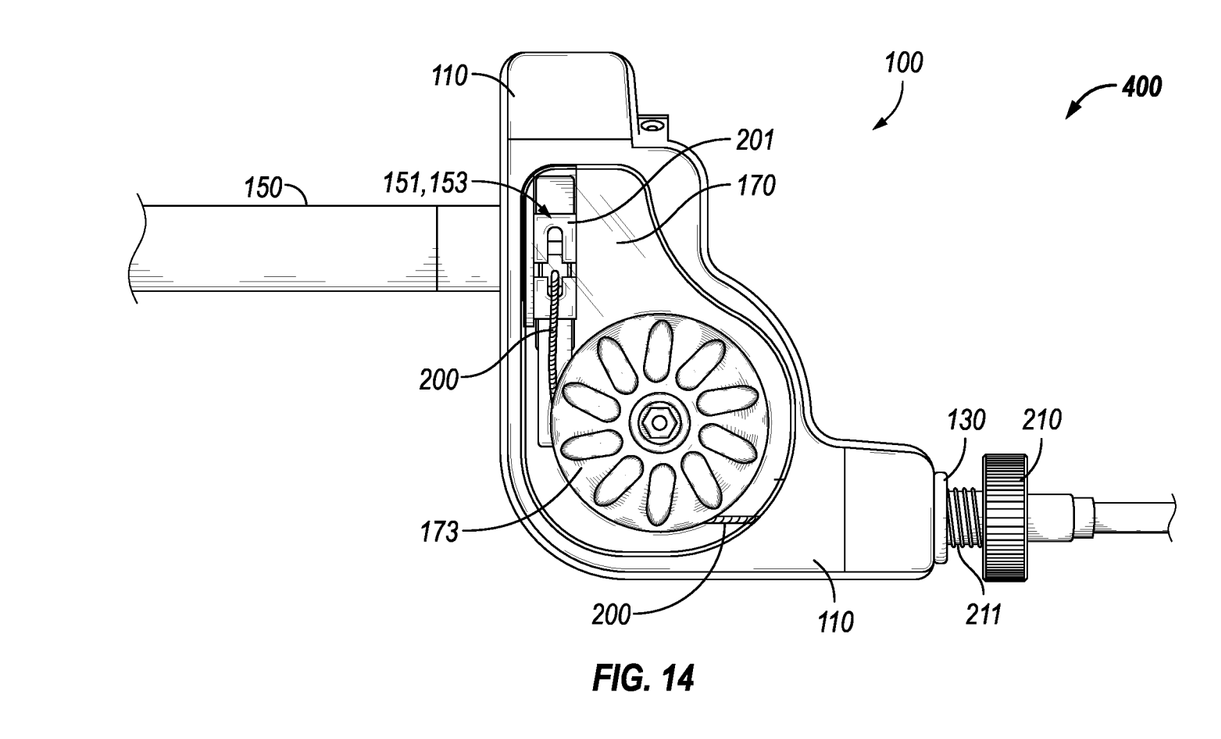
FIG. 14 shows an embodiment of a throttle system for a motorcycle.
Figure 15:
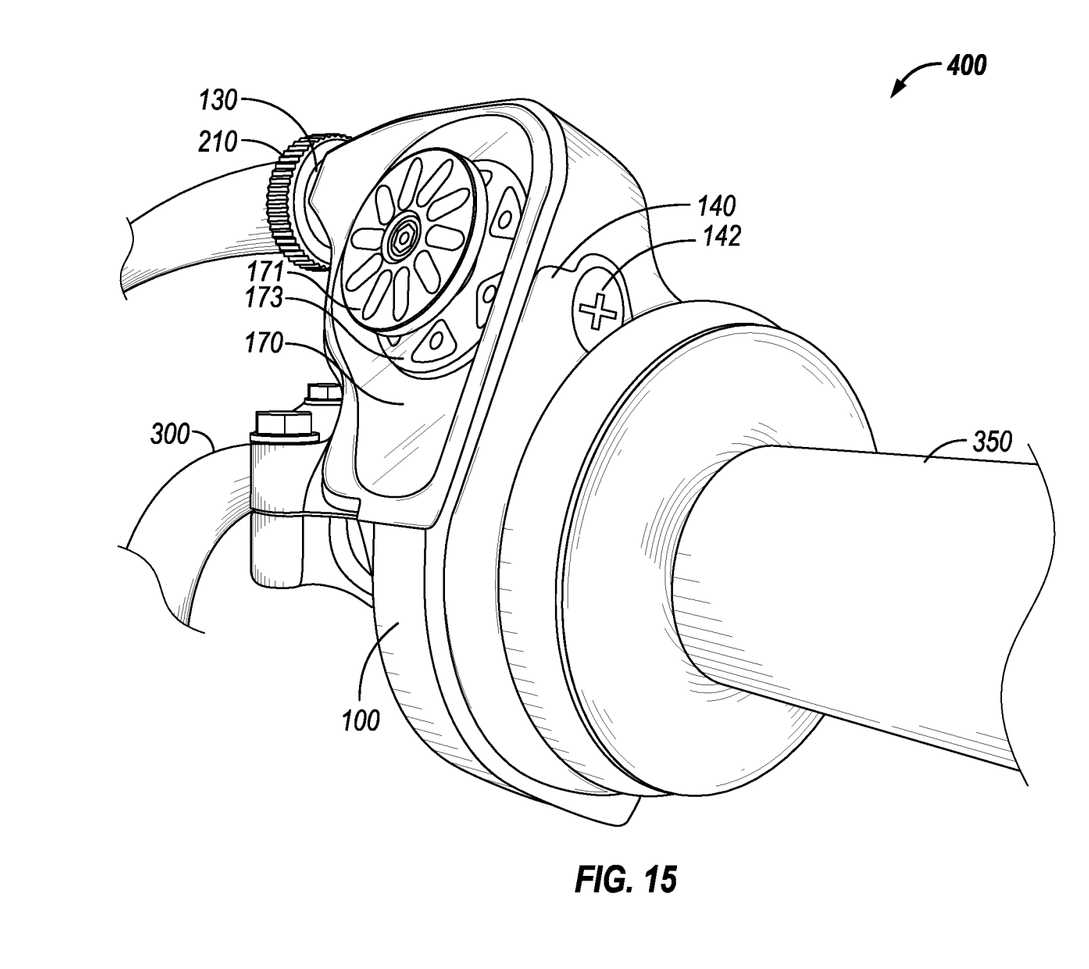
FIG. 15 shows an embodiment of a throttle system for a motorcycle.

FIGS. 14 and 15 shows a motorcycle throttle system 400. The system 400 includes a housing 110 having an internal cavity 117 (best shown in FIGS. 4 and 5). The housing 110 includes an upper port 118 (best shown in FIG. 3B) that provides access to the internal cavity 117 and a first lower port 119 (best shown in FIGS. 3A and 3B) that provides access to the internal cavity 117. The system 400 includes a plate 140 connected to the housing. The plate 140 encloses the internal cavity 117 of the housing 110. The plate 170 includes a second lower port 141 (best shown in FIG. 10) that provides access to the internal cavity 117. The second lower port 141 is axially aligned with the first lower port 119 in the housing 110.

The system 400 includes a hollow tube, also referred to as a throttle actuator, 150 having a first end 151 and a second end 152 (best shown in FIG. 1). The hollow tube 150 is open at the first end 151 and closed at the second end 152 with the first end 151 of the hollow tube 150 being positioned within the internal cavity 117 of the housing 110. The hollow tube 150 extends out the second lower port 141 of the plate 140 away from the housing 110 with the second end 152 of the hollow tube 150 being positioned away from the right side 116 of the housing 110. The hollow tube 150 is configured to receive a portion of a handlebar 300 via the first lower port 119 in the housing 110 and into the interior cavity 155 of the hollow tube 150 via the first end 151 of the hollow tube 150. The system 400 includes a first insert 130 positioned within the upper port 118 of the housing 110. The first insert 130 includes first internal threads 131. The system 400 includes a first cable 200. The first cable 200 is a throttle cable that controls the RPMs of a motorcycle engine. The first cable 200 enters the housing 110 via the first insert 130 in the upper port 118 of the housing 110. An end 201 of the first cable 200 is connected to the first end 151 of the hollow tube 150 via a cable attachment profile 153 located on the exterior of the first end 151 of the hollow tube 150. The system 400 includes a first cable housing 210 that is threaded into the first insert 130 via the first internal threads 131 of the first insert 130 and threads 211 of the first cable housing 210.

The system 400 includes a clamp 120, 160 (best shown in FIG. 2) connected to the housing 110 with the clamp 120, 160 being positioned around the first lower port 119. The system 400 includes a portion of a handlebar 300 of a motorcycle inserted into the hollow tube 150 via the first lower port 119 and the first end 151 of the hollow tube 150. The clamp 120, 160 may selectively secure the housing 110, and thus the throttle assembly 100, to the handlebar 300. The axial rotation of the hollow tube, or throttle actuator, 150 within the housing 110 adjusts the RPMs of the motorcycle.

The system 400 includes a second throttle cable 200A and a second insert 130A. The system 400 may include more than two inserts 130, 130A to accommodate various sizes and kinds of throttle cables 200, 200A and cable housings 210, 210A as would be appreciated by one of ordinary skill in the art having the benefit of this disclosure. The second insert 130A may be inserted into the upper port 118 of the housing 110 upon removal of the first cable 200 and the first insert 130, wherein the second insert 130A includes second internal threads 131A that differ from the first internal threads 131. The system 400 may include a second cable housing 210A threaded into the second insert 130A via the second internal threads 131A.

The system 400 includes a transparent plate 170 connected to a portion of the housing 110. The transparent plate 170 provides visual access to the internal cavity 117 of the housing 110. The transparent plate 170 enables visual inspection of the internal components of the throttle assembly 100 without requiring the disassembly of the throttle assembly 100 as would be appreciated by one of ordinary skill in the art having the benefit of this disclosure. The system 400 includes a pulley 173 positioned between the transparent plate 170 and the housing 110. A portion of the first cable 200 is positioned within a portion of the pulley 173 between the first insert 130 and the first end 151 of the hollow tube 150. The hollow tube, or throttle actuator, 150 is rotated within in the housing 110 to move the first end 201 of the throttle cable 200. The movement of the first end 201 of the throttle cable 200 adjusts the RPMs of the motorcycle engine as would be appreciated by one of ordinary skill in the art having the benefit of this disclosure. A grip 350 may be slid over the second end 152 of the hollow tube 150. The grip 350 may be used to match the color scheme of the motorcycle and/or may provide for a more cushioned grip on the throttle actuator 150.

Although this disclosure has been described in terms of certain preferred embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:

1. A system comprising:
    a housing having an internal cavity, the housing having an upper port that provides access to the internal cavity and a first lower port that provides access to the internal cavity;
    a plate connected to the housing, the plate encloses the internal cavity, the plate includes a second lower port that provides access to the internal cavity, the second lower port being axially aligned with the first lower port in the housing;
    a hollow tube having a first end and a second end, the hollow tube is open at the first end and closed at the second end, the first end of the hollow tube is positioned within the internal cavity of the housing, wherein the hollow tube extends out the second lower port of the plate away from the housing with the second end of the hollow tube being positioned away from the housing, wherein the hollow tube is configured to receive a portion of a handlebar via the first lower port in the housing and via the first end of the hollow tube and wherein the hollow tube is a single piece of aluminum;
    a first insert positioned within the upper port, wherein the first insert includes first internal threads;
    a first cable, the first cable enters the housing via the first insert in the upper port with an end of the first cable being connected to the first end of the hollow tube; and
    a first cable housing being threaded into the first insert via the first internal threads.

2. The system of claim 1 further comprising two fasteners that selectively retains the first insert within the upper port.

3. The system of claim 2, wherein the two fasteners may be selectively removed to remove the first insert and a second insert having second internal threads may be inserted into the upper port.

4. The system of claim 3, further comprising a clamp connected to the housing, the clamp being positioned around the first lower port.

5. The system of claim 4, a portion of the handlebar of a motorcycle inserted into the hollow tube via the first lower port and the first end of the hollow tube, wherein the clamp selectively secures the housing to the handlebar.

6. The system of claim 5, wherein axial rotation of the hollow tube within the housing adjusts a throttle of the motorcycle.

7. The system of claim 6, further comprising a second cable, wherein the second insert may be inserted into the upper port upon removal of the first cable and the first insert, wherein the second insert includes second internal threads that differ from the first internal threads.

8. The system of claim 7, further comprising a second cable housing threaded into the second insert via the second internal threads.

9. The system of claim 1, further comprising a transparent plate connected to a portion of the housing, wherein the transparent plate provides visual access to the internal cavity.

10. The system of claim 9, further comprising a pulley positioned between the transparent plate and the housing.

11. The system of claim 10, wherein a portion of the first cable is positioned within a portion of the pulley between the first insert and the first end of the hollow tube.

12. The system of claim 11, wherein the hollow tube may rotate within in the housing to move the first end of the cable.

13. An apparatus comprising:
a housing having a front side, a back side opposite the front side, a top, a bottom opposite the top, a left side, a right side opposite the left side, and an internal cavity, the housing having an upper port on the left side that provides access to the internal cavity and a first lower port on the left side that provides access to the internal cavity;
a plate connected to the right side of the housing, the plate encloses the internal cavity, the plate includes a second lower port that provides access to the internal cavity, the second lower port being axially aligned with the first lower port on the left side of the housing;
a hollow tube having a first end and a second end, the hollow tube is open at the first end and closed at the second end, the hollow tube includes a cable attachment profile on an exterior of the first end, the first end of the hollow tube is positioned within the internal cavity of the housing, wherein the hollow tube extends out the second lower port of the plate away from the housing with the second end of the hollow tube being positioned away from the right side of the housing, wherein the hollow tube is configured to receive a portion of a handlebar via the first lower port in the housing and via the first end of the hollow tube, wherein the hollow tube may twist axially within the housing, and wherein the hollow tube is a single piece of aluminum;
a clamp connected to the housing, the clamp positioned on the left side and being positioned around the first lower port; and
a first insert positioned within the upper port, wherein the first insert includes first internal threads.

14. The apparatus of claim 13, further comprising two fasteners that selectively retains the first insert within the upper port.

15. The apparatus of claim 14, wherein the two fasteners may be selectively removed to remove the first insert and a second insert having second internal threads may be inserted into the upper port.

16. The apparatus of claim 15, wherein the second internal threads differ from the first internal threads.

17. The apparatus of claim 16, further comprising a transparent plate on a portion of the top of the housing, wherein the transparent plate enables visual access to the internal cavity.

18. The apparatus of claim 17, further comprising a fastener that connects the transparent plate to the housing.

19. The apparatus of claim 18, further comprising a pulley positioned between the transparent plate and the housing.

20. The apparatus of claim 19, wherein the fastener rotatably connects the pulley to the transparent plate and the housing.

* * * * *